United States Patent
Tetzner et al.

(10) Patent No.: US 12,481,377 B2
(45) Date of Patent: Nov. 25, 2025

(54) MOUSE DEVICE HAVING BUTTON WITH PLURALITY OF TOUCH ZONES

(71) Applicant: Voyetra Turtle Beach, Inc., San Diego, CA (US)

(72) Inventors: Thaddaeus Erasmus Georg Richard Tetzner, Hamburg (DE); Chih Wei Hung, New Taipei (TW); Yi-Chieh Lin, New Taipei (TW); Ying Chieh Hung, New Taipei (TW); Chieh Hua Yuan, New Taipei (TW)

(73) Assignee: Voyetra Turtle Beach, Inc., San Diego, CA (US)

( * ) Notice: Subject to any disclaimer, the term of this patent is extended or adjusted under 35 U.S.C. 154(b) by 0 days.

(21) Appl. No.: 18/725,457

(22) PCT Filed: Dec. 19, 2022

(86) PCT No.: PCT/US2022/081908
§ 371 (c)(1),
(2) Date: Jun. 28, 2024

(87) PCT Pub. No.: WO2023/129827
PCT Pub. Date: Jul. 6, 2023

(65) Prior Publication Data
US 2025/0103150 A1 Mar. 27, 2025

(30) Foreign Application Priority Data

Dec. 29, 2021 (TW) .................................. 110215582
Dec. 30, 2021 (CN) .......................... 202123376595.5

(51) Int. Cl.
G06F 3/0354 (2013.01)
G06F 3/041 (2006.01)

(52) U.S. Cl.
CPC ........ G06F 3/03543 (2013.01); G06F 3/0416 (2013.01)

(58) Field of Classification Search
CPC .......................... G06F 3/03543; G06F 3/0416
See application file for complete search history.

(56) References Cited

U.S. PATENT DOCUMENTS

| | | | |
|---|---|---|---|
| 2001/0015718 A1* | 8/2001 | Hinckley | G06F 3/03547 345/156 |
| 2006/0274042 A1* | 12/2006 | Krah | G06F 3/03543 345/163 |
| 2007/0152966 A1 | 7/2007 | Krah | |
| 2007/0229472 A1 | 10/2007 | Bytheway | |

(Continued)

*Primary Examiner* — Ryan A Lubit
(74) *Attorney, Agent, or Firm* — Sheppard Mullin Richter & Hampton LLP (57) ABSTRACT

Embodiments provide a mouse device that includes with a plurality of touch areas on one or more mouse buttons. The mouse device includes a touch panel, a press switch, a button cover and a control panel. The touch panel triggers a corresponding touch signal when any one of the plurality of touch areas respectively corresponding to a plurality of input events is pressed. A switch signal is triggered when the press switch is pressed. The button cover is used to receive a pressing operation of pressing, toward inside, the touch panel, and press the press switch via the touch panel. When receiving the touch signal and the switch signal, the control panel triggers the input event of the pressed touch area.

10 Claims, 7 Drawing Sheets

(56) References Cited

U.S. PATENT DOCUMENTS

| | | |
|---|---|---|
| 2010/0242274 A1 | 9/2010 | Rosenfeld et al. |
| 2010/0245246 A1* | 9/2010 | Rosenfeld ............. G06F 3/0383 |
| | | 345/163 |
| 2013/0120259 A1* | 5/2013 | Piot ...................... G06F 3/04883 |
| | | 345/163 |
| 2013/0127719 A1* | 5/2013 | Yasutake ............. G06F 3/03543 |
| | | 345/163 |
| 2013/0169424 A1* | 7/2013 | Kujawski ............... G06F 3/0485 |
| | | 340/407.2 |
| 2014/0022173 A1* | 1/2014 | Ma .......................... G06F 3/023 |
| | | 345/163 |
| 2017/0212628 A1* | 7/2017 | Lee ........................ H04N 23/57 |
| 2019/0302899 A1 | 10/2019 | Lin |

* cited by examiner

MOUSE DEVICE HAVING BUTTON WITH PLURALITY OF TOUCH ZONES

CROSS-REFERENCE TO RELATED APPLICATIONS

This application is a National Phase application under 35 U.S.C. § 371 of PCT Application No. PCT/US2022/081908, filed Dec. 19, 2022, which application claims the benefit of Taiwan Patent Application No. 110215582, filed Dec. 29, 2021 (which issued as Taiwan Patent No. M629356 on Jul. 11, 2022), and Chinese Patent Application No. 202123376595.5, filed Dec. 30, 2021 (which issued as Chinese Patent No. ZL 202123376595.5 on Oct. 28, 2022), which are hereby incorporated herein by reference in their entirety.

TECHNICAL FIELD

The present utility model relates to a mouse device, in particular to a mouse device with multiple touch areas on buttons.

BACKGROUND ART

The existing mechanical mouse triggers input events through mechanical switches. That is, the number of mechanical switches is equal to the number of input events that can be triggered.

The click operation of the aforementioned mechanical switch has a sense of feedback (for example, the senses of pressing and bouncing back), which allows a user to clearly determine whether the click operation is completed.

In order to trigger a larger number of input events, the mechanical mouse must be provided with a larger number of mechanical switches.

The above solution can greatly increase the manufacturing cost of the mechanical mouse. In addition, when there are too many mechanical switches, the user is likely to accidentally touch a wrong button. This may result in a poor experience.

Currently, another kind of touch mouse has been proposed. The touch mouse uses a touch panel to replace the mouse buttons. A user is allowed to make different gestures on the touch panel (such as single click, consecutive clicks, single-finger swipe, multi-finger swipe, etc.) to trigger different types of input events.

However, the touch mouse triggers input events through resistance or capacitance changes, which cannot generate feedback such as that generated by a mechanical switch. This makes it impossible for a user to determine whether a click operation is completed when the user clicks such an existing touch mouse, resulting in a poor experience.

In addition, compared to directly clicking on a mechanical switch, input gestures are too time-consuming. This makes the touch mouse unsuitable for applications that need to quickly trigger input events, such as e-sports, document editing, and image editing.

Therefore, the existing mouse devices have the above-mentioned problems, and more effective solutions are urgently needed.

Summary of the Utility Model

A main object of the present utility model is to provide a mouse event, where different mouse events can be triggered through different areas of the same button.

In one embodiment, a mouse device with a plurality of touch areas on a button comprises a touch panel, a press switch, a button cover and a control panel; the touch panel is used for triggering a touch signal corresponding to a pressed touch area when any one of the plurality of touch areas is pressed; the plurality of touch areas respectively correspond to a plurality of input events; the press switch is disposed on an inner side of the touch panel and used for triggering a switch signal when the press switch is pressed; the button cover is disposed on an outer side of the touch panel, and used for receiving a pressing operation of pressing, toward inside, the touch panel, and pressing the press switch through the touch panel; and the control panel is electrically connected to the touch panel and the press switch, and used for, when receiving the touch signal and the switch signal, triggering an input event of the pressed touch area.

In one embodiment, the plurality of touch areas comprises a first touch area corresponding to a mouse event and a second touch area corresponding to a first button combination event.

In one embodiment, the plurality of touch areas comprises a third touch area corresponding to a second button combination event.

In one embodiment, the first touch area is a mouse right button area or a mouse left button area, and the mouse event is a right button event or a left button event.

In one embodiment, the mouse device further comprises a touch circuit, which is electrically connected to the touch panel and the control panel, and used for sensing the pressing on the plurality of touch areas and sending the touch signal to the control panel.

In one embodiment, the mouse device further comprises a side touch panel, which is electrically connected to the control panel for triggering a side touch signal of a pressed side touch area when any one of a plurality of side touch areas is pressed, the plurality of side touch areas corresponding to the plurality of input events, respectively; the control panel is set to trigger the input event of the pressed side touch area when the control panel receives the side touch signal.

In one embodiment, the control board further comprises a control firmware, the control firmware is used to control the control panel to identify a touch area corresponding to a received touch signal after the control firmware is executed, and trigger the input event of the touch area.

In one embodiment, the plurality of touch areas are adjustable, and a control firmware is used to define ranges of the plurality of touch areas.

In one embodiment, the control firmware is used to define boundaries of the plurality of touch areas.

In one embodiment, the mouse device further comprises an application program to be installed on a computer device connected to the mouse device, the application program is used to, after the application program is executed, display an operation interface through the computer device, receive an area adjustment operation for adjusting ranges of the plurality of touch areas through the operation interface, and set a control firmware based on adjusted touch areas, the application program is used for receiving an input setting operation for setting the input events corresponding to the touch areas through an operation interface, and setting a control firmware based on adjusted input events to transmit the control firmware to the mouse device through the computer device.

The present utility model can increase the number of input events that can be triggered quickly; it can also provide a touch click with a sense of feedback, which can improve the user experience.

IN THE FIGURES

1: mouse device; 10: control panel; 11: touch panel; 12: press switch; 2: mouse device; 20: control panel; 21: touch panel; 22: side touch panel; 23: touch circuit; 24: press switch; 25: side press switch; 26: pointing module; 27: wheel sensor; 28: communication interface; 29: indication interface; 3: computer device; 40: control firmware; 41: application program; 5: mouse device; 50: shell; 500: left button cover; 501: wheel; 502: right button cover; 503: first side button; 504: second side button; 505: side cover; 510: left touch panel; 511: right touch panel; 520: side touch panel; 521: side support plate; 530: left press switch; 531: right press switch; 532: left press plate; 533: right press plate; 54: touch circuit; 55: control panel; 56: base; 570: wheel sensor; 571: middle press switch; R11, R12, R13, R21, R22, R23, R31, R32, R33: touch area.

DESCRIPTION OF THE EMBODIMENTS

The present utility model will be further described below in conjunction with the accompanying drawings and specific embodiments, so that a person skilled in the art can better understand the present utility model and implement the present utility model. However, the embodiments provided herein are not intended to limit the present utility model.

The present utility model mainly proposes a mouse device with multiple touch areas on a button. The button of the mouse device is provided with a touch panel. A user can trigger different input events by pressing different positions of the same button (that is, different touch areas).

Therefore, the present utility model allows different areas of a single button to be used to trigger different input events.

Figure 1:
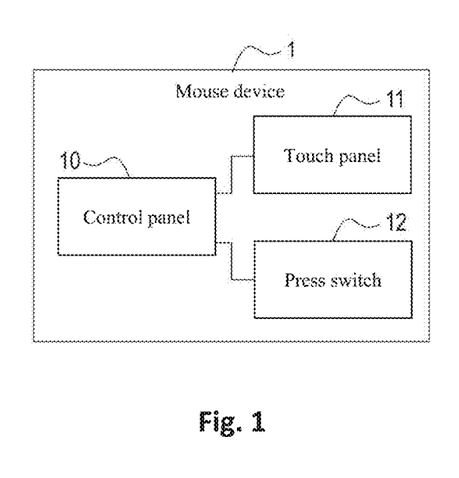
FIG. 1 is an architecture diagram of a mouse device according to an embodiment of the present utility model.

Please refer to FIG. 1, which is an architecture diagram of a mouse device 1 according to an embodiment of the present utility model.

In this embodiment, the mouse device 1 may include a touch panel 11, a press switch 12, and a control panel 10 electrically connected to the foregoing elements.

The touch panel 11 is defined with a plurality of touch areas, and is used to trigger a touch signal corresponding to a pressed touch area when any one of the plurality of touch areas is pressed.

The touch panel 11 can be, for example, a capacitive touch panel, a resistive touch panel, or other thin-film touch panels. This is not limited herein.

In one embodiment, the touch signal can be used to locate the pressed position on the touch panel 11, so that the control panel 10 can determine the touch area pressed by the user.

In one embodiment, a plurality of touch areas may be defined to correspond to a plurality of input events, respectively. The input event can be, for example, a single button event such as a left button event, a middle button event, a right button event, a button "E" event, a button "S" event, etc., or a combination of the left button event and the middle button event, a combination of the left button event and the button "e" event, a combination of the button "ctrl" event and the button "c" event, and the like.

The press switch 12 (for example, a micro-switch) can be disposed on an inner side of the touch panel 11, so that a user can press the touch panel 11 toward the inside to press the press switch 12 following pressing the touch panel 11. The press switch 12 is used to trigger a switch signal when it is pressed.

In one embodiment, the switch signal and the touch signal may be binary signals (for example, signals having only two states, on and off).

The control panel 10 is used to control the mouse device 1 to trigger a corresponding input event based on a user's pressing operation.

In one embodiment, when the control panel 10 receives a touch signal and a switch signal from the same button, it can identify the pressed touch area and trigger an input event corresponding to the touch area.

In one embodiment, the plurality of touch areas may be connected to the control panel 10 through different circuits, so that the control panel 10 may identify the pressed touch area based on the circuit on which the touch signal is received.

In one embodiment, the touch panel 11 may include a plurality of sensing points, and the plurality of sensing points can be dynamically allocated to the plurality of touch areas.

For example, if the touch panel 11 includes 30 sensing points: In a first setting, the 1st to 15th sensing points can be allocated to the first touch area, and the 16th to 30th sensing points can be allocated to the second touch area. In a second setting, the 1st to 10th sensing points can be allocated to the first touch area, and the 11th to 30th sensing points can be allocated to the second touch area. In a third setting, the 1st-10th sensing points can be allocated to the first touch area, the 11th-20th sensing points can be allocated to the second touch area, and the 21st-30th sensing points can be allocated to the third touch area.

Figure 10:
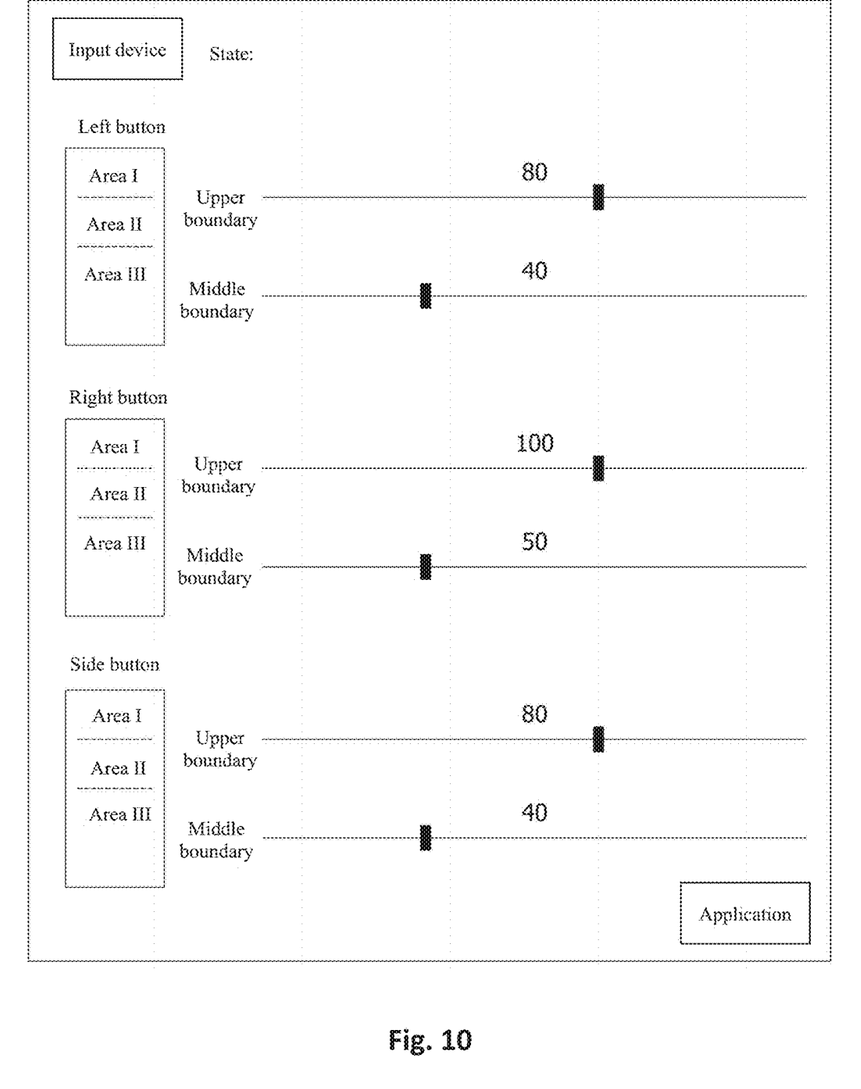
FIG. 10 is a schematic diagram of an operation interface of an application program according to an embodiment of the present utility model.

In this way, when any sensing point is triggered, the control panel 11 can quickly identify the pressed touch area based on the set allocation relationship (for example, a setting method similar to that shown in FIG. 10 may be used).

In one embodiment, when the control panel 10 only receives a touch signal, but does not receive a switch signal of the same button, it can be determined that the touch signal is a false touch, and the touch signal can thus be filtered out.

In this way, a user must press the touch panel 11 until the press switch 12 is triggered in order to trigger a corresponding input event. Such an operation allows a user to have a sense of feedback like that of a mechanical switch when pressing the touch panel 11, and to determine whether the click is completed.

In one embodiment, when the control panel 10 receives a switch signal and a touch signal of the same button, the time difference between the trigger time of the switch signal and the trigger time of the touch signal can be calculated; when the time difference is less than a preset value (for example, 0.1 seconds, 0.05 seconds, 0.5 seconds, etc.), the input event corresponding to the corresponding touch area will be triggered.

Figure 3:
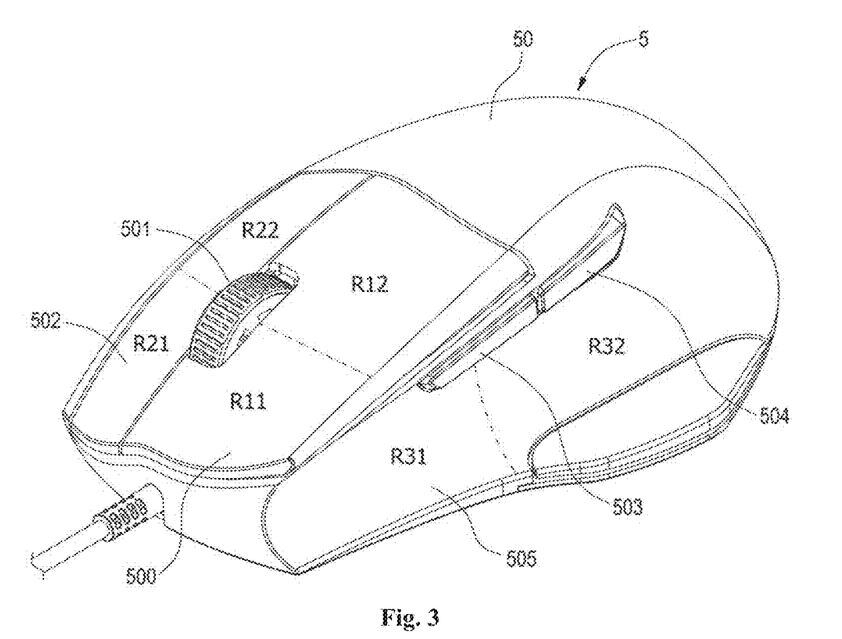
FIG. 3 is a schematic diagram of the appearance of a mouse device according to an embodiment of the present utility model.

Please refer to FIG. 3, which is a schematic diagram of the appearance of a mouse device according to an embodiment of the present utility model.

In this embodiment, the mouse device 5 includes a shell 50.

The shell 50 includes a button cover (a left button cover 500 and a right button cover 502), a scroll wheel 501, side buttons (a first side button 503 and a second side button 504), and a side cover 505.

The control panel, the press switch and the touch panel are all arranged in the shell 50.

In one embodiment, the mouse device 5 has a plurality of touch panels, such as a left touch panel, a right touch panel, and a side touch panel.

The left touch panel corresponds to the left mouse button, and can be divided into a touch area R11 and a touch area R12, that is, different areas of the left mouse button can be used to trigger two input events, respectively.

The right touch panel corresponds to the right mouse button, and can be divided into a touch area R21 and a touch area R22, that is, different areas of the right mouse button can be used to trigger two input events, respectively.

The side touch panel can be divided into a side touch area R31 and a side touch area R32, that is, different areas of the mouse side panel can be respectively used for two input events.

In an embodiment, a first touch area of the multiple touch areas of the same button may correspond to a mouse event, and a second touch area may correspond to a button combination event (a first button combination event).

For example, the touch area R11 and the touch area R21 may respectively correspond to a left button event and a right button event. The touch area R12 may correspond to a combination button event of a left button event and a button "e" event. The touch area R22 may correspond to a button combination event of a right button event and a button "e" event.

In another example, the touch area R12 and the touch area R22 may respectively correspond to the left button event and the right button event. The touch area R11 and the touch area R22 may correspond to different button combination events.

Figure 2:
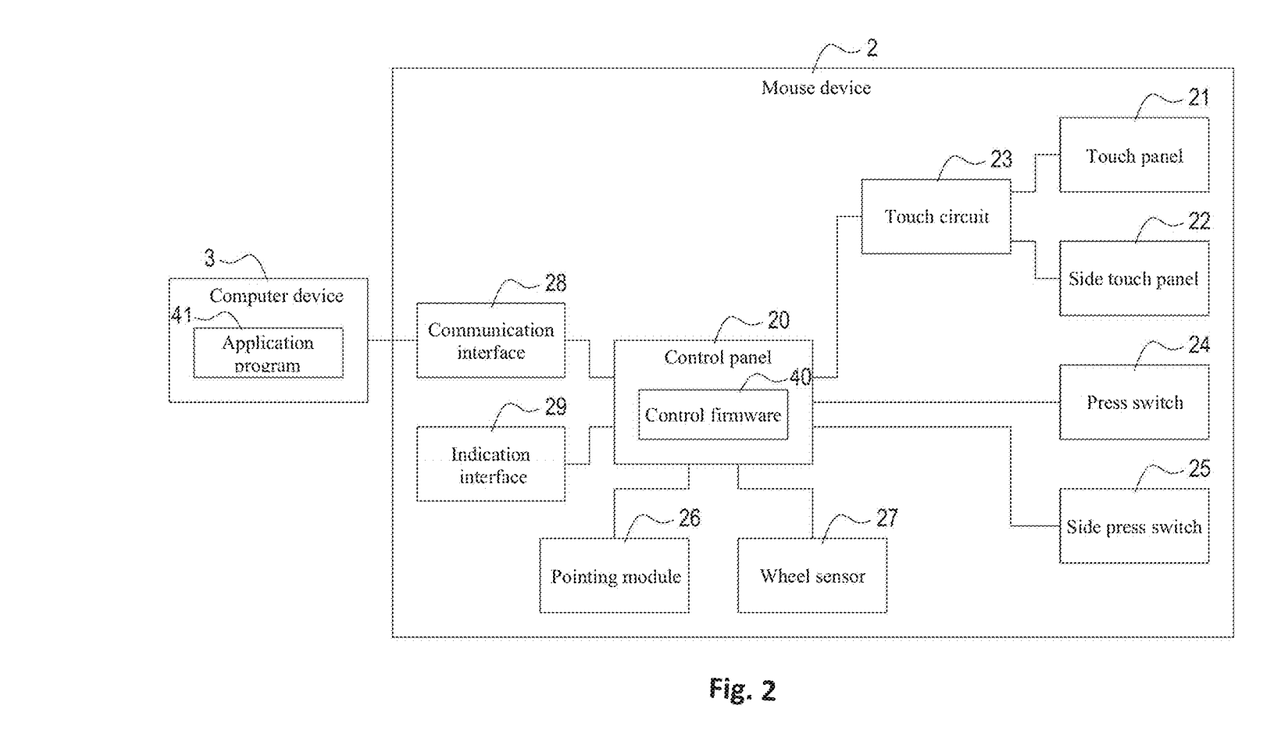
FIG. 2 is an architecture diagram of a mouse device according to an embodiment of the present utility model.

Please refer to FIG. 2, which is an architecture diagram of a mouse device according to an embodiment of the present utility model.

In this embodiment, the mouse device 2 may include a touch panel 21, a side touch panel 22, a touch circuit 23, a press switch 24, a side press switch 25, a pointing module 26, a wheel sensor 27, a communication interface 28, an indication interface 29, and a control panel 20 electrically connected to the foregoing components.

In an embodiment, the touch panel 21 and the side touch panel 22 are connected to the touch circuit 23, and are further connected to the control panel 20 through the touch circuit 23.

Specifically, when the touch pad 21 and the side touch pad 22 are pressed, the touch circuit 23 can locate the pressed touch position (such as the aforementioned sensing point), and trigger a touch signal corresponding to the touch position to be sent to the control panel 20, so that the control panel 20 can quickly identify the pressed touch area based on a set allocation relationship.

In an embodiment, the touch circuit 23 can sense the pressing on a plurality of touch areas (including the touch areas R11 to R22, and the side touch areas R31 and R32), and send corresponding touch signals to the control panel 20.

In one embodiment, the touch circuit 23 can perform signal processing (such as noise filtering processing, enhancement processing, false touch detection, etc.) on the touch signal, and transmit the processed touch signal to the control panel 20.

In one embodiment, the side touch panel 22 is provided with a plurality of side touch areas, and can trigger a side touch signal of the pressed side touch area when any one of the plurality of side touch areas is pressed. The aforementioned plurality of side touch areas respectively correspond to a plurality of input events, and the corresponding relationship can be set by a user as needed.

Moreover, the control panel 20 is configured to trigger an input event corresponding to the pressed side touch area when receiving the side touch signal.

When the switch 24 (such as the micro-switches that are arranged on the left, right and middle mouse buttons of the mouse) and the side press switch 25 (such as the micro-switches that are arranged on the side buttons) are pressed, this can trigger a corresponding switch signal to the control panel 20.

The pointing module 26 (such as a trackball sensor, an optical displacement sensor, or another type of pointing sensor) can be used to sense a user's movement mouse operation, and trigger a corresponding movement mouse signal to move the position of the mouse pointer in the computer device 3.

The scroll wheel sensor 27 is used to sense a scroll wheel operation of a user, and trigger a corresponding scroll wheel mouse signal (scroll speed and scroll direction).

The communication interface 28 may be a wireless or wired interface, such as a Bluetooth interface or a USB interface. The communication interface 28 is used to connect the computer device 3 so as to transmit input events to the computer device 3 for execution, or to receive updates of the control firmware 40 from the computer device 3.

The indication interface 29 (such as an LED indicator light) is used to indicate the state of the mouse device 2, such as a power level, a connection state, a working mode, and the like.

The control panel 20 is used to control the mouse device 2. In one embodiment, the control panel 20 controls each component of the mouse device 2 by means of executing the control firmware 40.

In one embodiment, after a controller (not shown) of the control panel 20 executes the control firmware 40, it can detect the triggering of the switch signal and the touch signal, and can identify the touch area corresponding to the received touch signal, and trigger the input event of the touch area.

In one embodiment, the mouse device 2 includes an application program 41. The application 41 can be installed on the computer device 3 (for example, a notebook computer, a desktop computer, a tablet computer, etc.) connected to the mouse device 2.

After the application program 41 is executed by the computer device 3, the application program 41 can display an operation interface (for example, a graphical user interface) through the display of the computer device 3. The aforementioned operation interface can be used to perform various settings on the mouse device 2.

In one embodiment, the operation interface can be used to set the range of each touch area and the corresponding input event.

Please refer to FIG. 2 and FIG. 10 together. FIG. 10 is a schematic diagram of an operation interface of an application program according to an embodiment of the present utility model.

In this embodiment, each touch panel is divided into three touch areas as an example.

In one embodiment, the control firmware 40 defines the range of each touch area. The clicked touch area can be identified according to the pressed touch position(s).

In one embodiment, the control firmware 40 defines the boundaries of a plurality of touch areas, so as to define the range of each touch area through the boundaries.

In an embodiment, the range of each touch area can be adjusted by the computer device 3 through the application program 41.

In one embodiment, after the application program 41 is executed by the computer device 3, the operation interface shown in FIG. 10 can be displayed by the computer device 3; an area adjustment operation from a user can be received to adjust the range of the plurality of touch areas through the operation interface, a new control firmware 40 can be set based on the adjusted plurality of touch areas, and the new control firmware 40 is then transmitted to the mouse device 2 through the computer device 3 for execution.

In one embodiment, the application program 41 may receive an input setting operation for setting a plurality of input events corresponding to the plurality of touch areas through the operation interface, a new control firmware can be set based on a plurality of adjusted input events, and the new control firmware 40 is then transmitted to the mouse device 2 through the computer device 3 for execution.

In one embodiment, the aforementioned operation interface can display the state of the input device (that is, the connected mouse device 2), the separation boundaries (upper boundary and middle boundary) of the three touch areas of the left button, the separation boundaries (upper boundary and middle boundary) of the three touch areas of the right button, and the separation boundaries (upper boundary and middle boundary) of the three touch areas of the side button.

In addition, a user can manually adjust the positions of the upper boundary and the middle boundary of the three touch areas of each button according to usage habits so as to adjust the touch area to a desired size.

In an embodiment, the control panel 20 can install the control firmware 40 corresponding to the setting mentioned above. Based on the set boundaries of the touch areas, the plurality of touch positions of the touch areas can be reallocated, so as to adjust the range and size of the touch areas.

Figure 4:
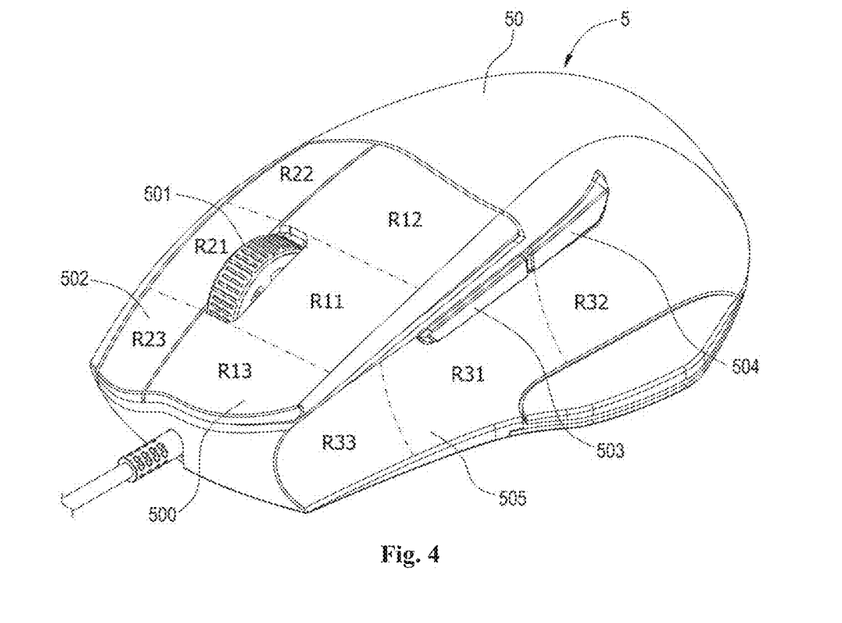
FIG. 4 is a schematic diagram of the appearance of a mouse device according to an embodiment of the present utility model.

Please refer to FIG. 3 and FIG. 4. FIG. 4 is a schematic diagram of the appearance of a mouse device according to an embodiment of the present utility model.

In this embodiment, each touch panel is divided into three touch areas.

The left touch panel is located in the left button area of the mouse; it is divided into touch areas R11 to R13, and can be used to trigger three input events.

The right touch panel is located in the right mouse button area; it is divided into touch areas R21 to R23, and can be used to trigger three input events.

The side touch pad is located in the mouse side area; it is divided into side touch areas R31 to R33, and can be used to trigger three input events.

In an embodiment, for the multiple touch areas of the same button, the first touch area can correspond to a mouse event (such as a left button event, a right button event or a middle button event), the second touch area can correspond to a button combination event (a first button combination event), and the third touch area can correspond to another button combination event (a second button combination event). However, this is not limited herein, and a user can arbitrarily change the above-mentioned corresponding relationship according to requirements.

Figure 5:
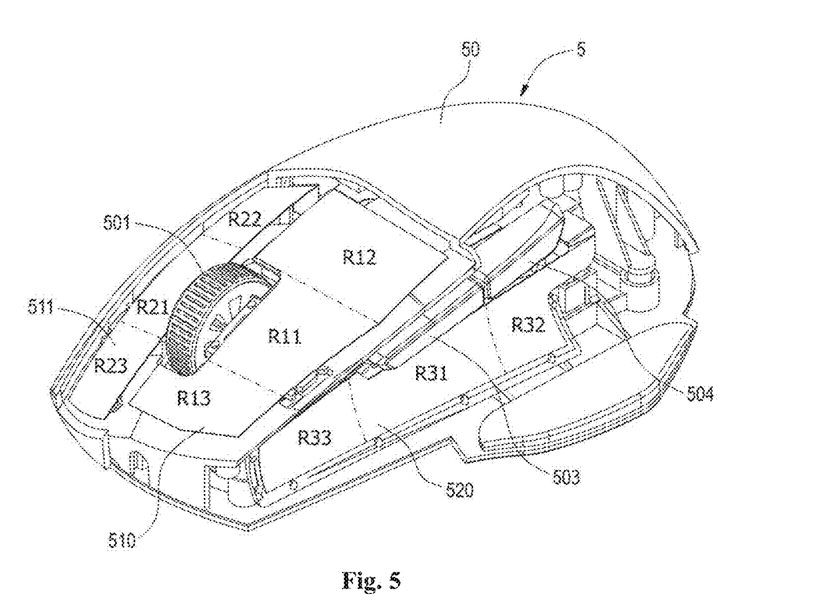
FIG. 5 is a schematic structural diagram of a mouse device according to an embodiment of the present utility model.
Figure 6:
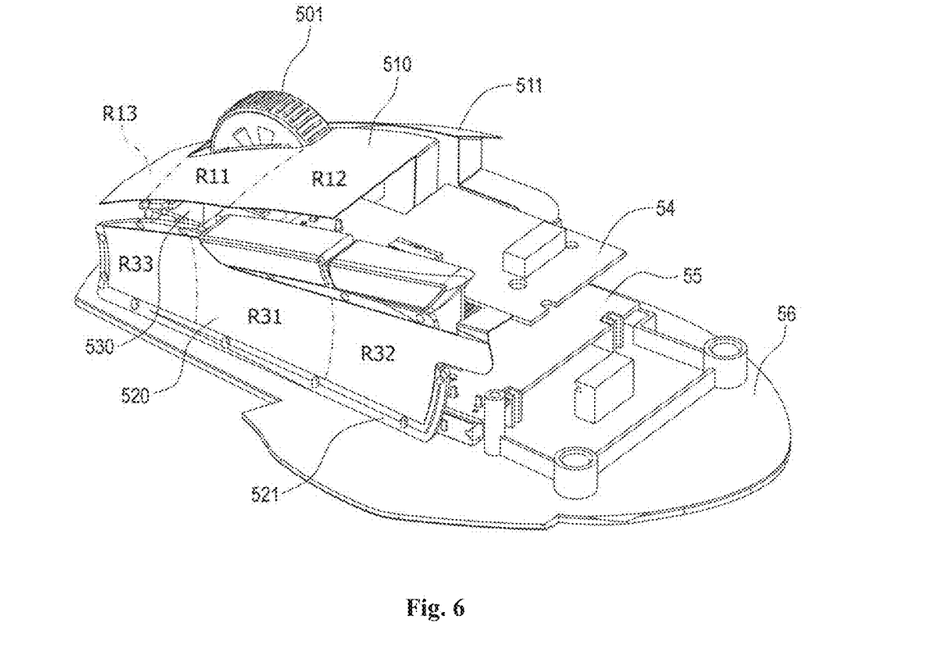
FIG. 6 is a schematic structural diagram of a mouse device according to an embodiment of the present utility model.
Figure 7:
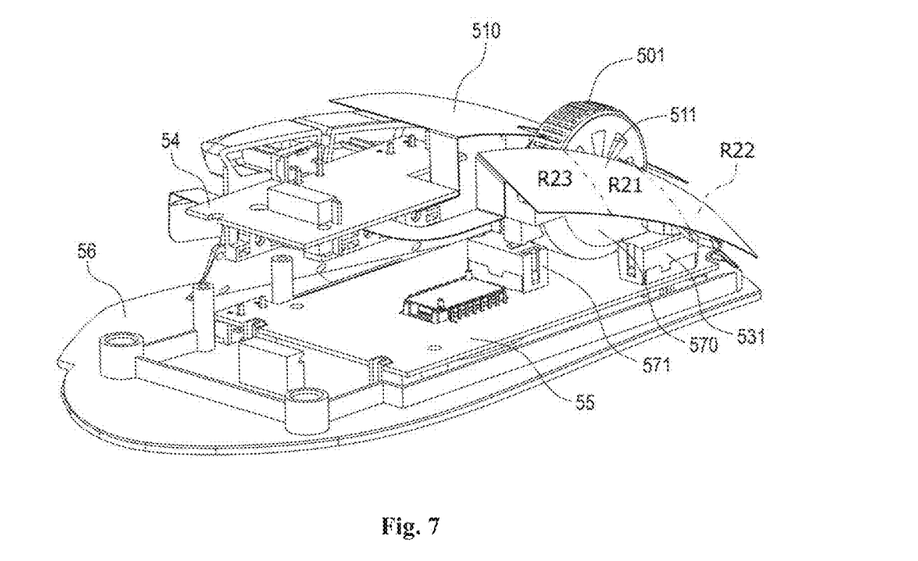
FIG. 7 is a schematic structural diagram of a mouse device according to an embodiment of the present utility model.
Figure 8:
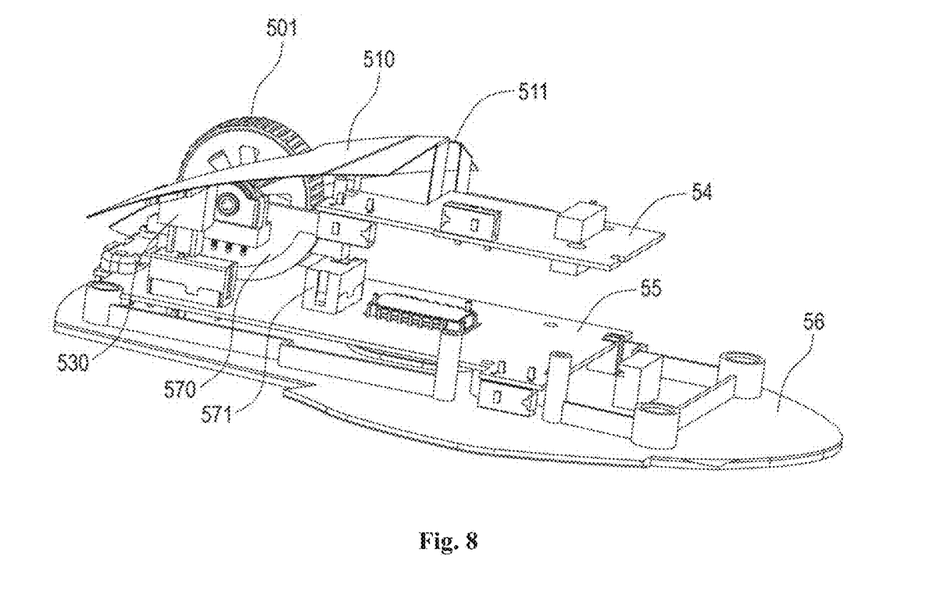
FIG. 8 is a schematic structural diagram of a mouse device according to an embodiment of the present utility model.
Figure 9:
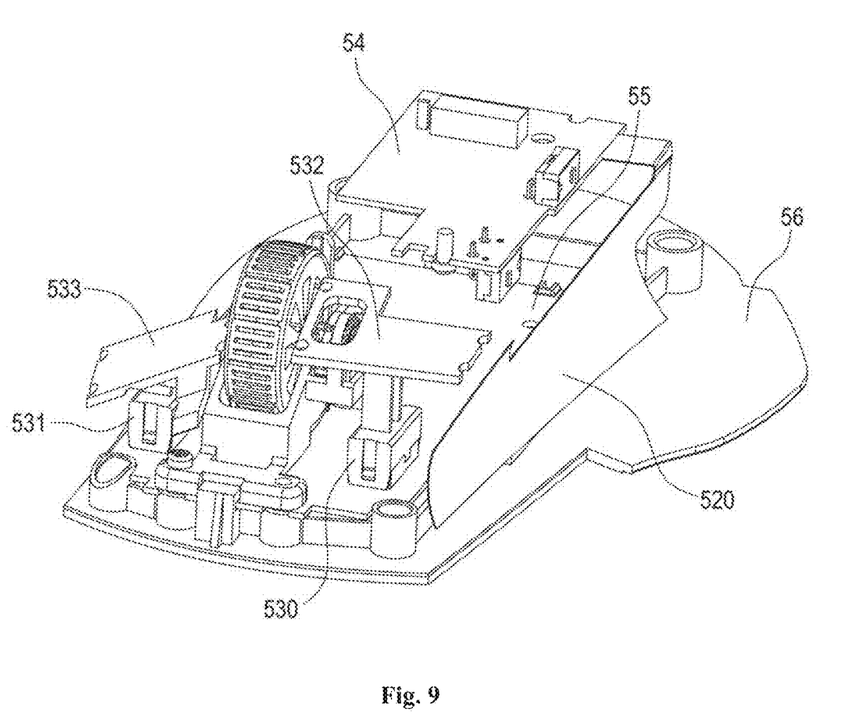
FIG. 9 is a schematic structural diagram of a mouse device according to an embodiment of the present utility model.

Please refer to FIG. 4 to FIG. 9. FIG. 5 is a schematic structural diagram of a mouse device according to an embodiment of the present utility model. FIG. 6 is a schematic structural diagram of a mouse device according to an embodiment of the present utility model. FIG. 7 is a schematic structural diagram of a mouse device according to an embodiment of the present utility model. FIG. 8 is a schematic structural diagram of a mouse device according to an embodiment of the present utility model. FIG. 9 is a schematic structural diagram of a mouse device according to an embodiment of the present utility model.

In one embodiment, the button cover is disposed on an outer side of the touch panel, and is used for receiving a pressing operation of pressing, toward the inside, the touch panel, and then pressing the press switch through the touch panel.

For example, when a user presses a front end of the left button cover 500, the front end of the left button cover 500 presses the touch area R13 of the front end of the left touch panel 510 toward the inside to trigger a touch signal. Next, the front end of the left button cover 500 continues to press the touch area R13, such that the touch area R13 presses the left press plate 532 to further press the left press switch 530 therebelow, so as to trigger a switch signal. The same principle applies to the middle end and rear end of the left button cover 500; details are not repeated herein.

In another example, when a user presses a middle end of the right button cover 502, the middle end of the right button cover 502 presses the touch area R21 at the middle end of the right touch panel 511 toward the inside to trigger a touch signal. Next, the middle end of the right button cover 502 continues to press the touch area R21, such that the touch area R21 presses the right press plate 533 to further press the right press switch 531 therebelow, so as to trigger a switch signal. The same principle applies to the front and rear ends of the right button cover 502; details are not repeated herein.

In another example, when a user clicks a rear end of the side cover 505, the rear end of the side cover 505 presses the touch area R33 at the rear end of the side touch panel 520 to trigger a touch signal. The same principle applies to the front end and the middle end of the side cover 505, and details are not repeated herein.

In one embodiment, an inner side of the side touch panel 520 can be provided with a press switch and a switch structure, so that a user can obtain a sense of feedback when pressing the side touch panel 520.

In an embodiment, an inner side of the side touch panel 520 may not be provided with a press switch and a switch structure, so that a user does not get a sense of feedback when pressing the side touch panel 520.

In an embodiment, when an inner side of the side touch panel 520 is not provided with a press switch and a switch structure, the inner side of the side touch panel 520 may be provided with a side support plate 521. The side support plate 521 is used to support the side touch panel 520 in the form of a film, so as to prevent the side touch panel 520 from being deformed or damaged due to a user's pressing.

In one embodiment, the left touch panel 510, the right touch panel 511 and the side touch panel 520 can be connected to the touch circuit 54 and further connected to the control panel 55 through the touch circuit 54.

In one embodiment, the mouse device 5 may include any combination of the left touch panel 510, the right touch panel 511 and the side touch panel 520.

For example, the mouse device 5 may include the left touch panel 510 and the right touch panel 511, but not the side touch panel 520.

For example, the mouse device 5 may include the side touch panel 520, but not the left touch panel 510 and the right touch panel 511.

In one embodiment, the control panel 55 is disposed on the base 56, and the touch circuit 54 is disposed above the control panel 55. In this way, the wiring length from the touch panel to the touch circuit 54 can be reduced, and the wiring of the mouse device 5 can be simplified.

In one embodiment, a wheel sensor 570 is disposed below the wheel 501.

In one embodiment, a middle press switch 571 corresponding to the middle button is provided below the scroll wheel 501. When a user presses the scroll wheel 501 to enable the middle press switch 571 to trigger a switch signal, the input event of the middle button is triggered.

It is worth mentioning that the existing touch mouse senses a user's touch gestures, and requires a high-resolution touch panel and a controller with high processing performance.

Since the mouse device of the present utility model only needs to sense whether the touch panel is pressed through touching, it does not need to sense the touch gesture of the user, it can greatly reduce the amount of calculation, and it can use low-resolution touch panels and low-processing-performance controllers.

It is worth mentioning that, although a single touch panel is divided into two touch areas or three touch areas as described in the foregoing embodiments, this is not limited in the present utility model.

In an embodiment, the number of touch areas of each touch panel can be planned and designed by a user according to requirements. Moreover, changing the number and range of the touch areas can be quickly implemented by means of updating the control firmware 40 without redesigning the hardware.

The above-mentioned embodiments are only some preferred embodiments for fully illustrating the present utility model. The scope of protection of the present utility model is not limited to them. Equivalent substitutions or modifications can be made by a person skilled in the art on the basis of the present utility model. All of these changes are within the scope of protection of the present utility model. The scope of protection of the present utility model is defined by the claims.

The invention claimed is:

1. A mouse device that includes a plurality of touch areas on a button, the mouse device comprising:
    a touch panel configured to trigger a touch signal corresponding to a pressed touch area when one of the plurality of touch areas is pressed, wherein each of the plurality of touch areas respectively correspond to a respective one of a plurality of input events, wherein the plurality of touch areas are manually adjustable to set an upper boundary and a middle boundary for each of the plurality of touch areas;
    a press switch disposed on an inner side of the touch panel, which when pressed triggers a switch signal when the press switch is pressed;
    a button cover disposed on an outer side of the touch panel configured to receive a pressing operation of pressing, toward inside, the touch panel, and pressing the press switch through the touch panel; and
    a control panel electrically connected to the touch panel and the press switch, configured to trigger an actuated input event of the pressed touch area upon receiving the touch signal and the switch signal.

2. The mouse device of claim 1, wherein the plurality of touch areas comprises a first touch area corresponding to a mouse event and a second touch area corresponding to a first button combination event.

3. The mouse device of claim 2, wherein the plurality of touch areas comprise a third touch area corresponding to a second button combination event.

4. The mouse device of claim 2, wherein the first touch area is a mouse right button area or a mouse left button area, and the mouse event is a right button event or a left button event.

5. The mouse device of claim 1, wherein the mouse device further comprises a touch circuit electrically connected to the touch panel and the control panel configured to sensing the pressing on the plurality of touch areas and sending the touch signal to the control panel.

6. The mouse device of claim 1, wherein the mouse device further comprises a side touch panel electrically connected to the control panel for triggering a side touch signal of a pressed side touch area upon any one of a plurality of side touch areas being pressed, wherein the plurality of side touch areas correspond to the plurality of input events respectively;
    wherein the control panel is set to trigger the actuated input event of the pressed side touch area when the control panel receives the side touch signal.

7. The mouse device of claim 1, wherein the control panel further comprises a control firmware;
    wherein the control firmware comprises instruction, which upon execution control the control panel to identify a touch area corresponding to a received touch signal after the control firmware is executed, and trigger the actuated input event of the touch area.

8. The mouse device of claim 1, wherein a control firmware comprises instructions to define ranges of the plurality of touch areas.

9. The mouse device of claim 1, further comprising an application program to be installed on a computer device connected to the mouse device;
    wherein the application program comprises application program instructions that, upon execution, display an operation interface through the computer device, receive an area adjustment operation for adjusting ranges of the plurality of touch areas through the operation interface, and set a control firmware based on adjusted touch areas;

wherein the application program instructions, upon execution, further cause the computing device to receive an input setting operation for setting the plurality of input events corresponding to the touch areas through the operation interface, and to set the control firmware based on adjusted input events;

wherein the application program instructions, upon execution, further cause the computing device to transmit the control firmware to the mouse device through the computer device.

10. The mouse device of claim 1, wherein two or more of the plurality of touch areas respectively correspond to a different one of the plurality of input events.

* * * * *